United States Patent [19]

Pusch et al.

[11] Patent Number: 4,464,418
[45] Date of Patent: Aug. 7, 1984

[54] HEAT REFLECTING WALL PAPER OR WALL COVERING

[76] Inventors: Gunther Pusch, Bannholzweg 12, 6903 Neckargemünd 2; Dieter E. Aisslinger, Heidestr. 54, 6222 Geisenheim; Alexander Hoffmann, Schlossstr. 32, 6909 Rotenberg; Klaus-Werner Pusch, Jakob-Bernhard-Str. 3 a, 6903 Neckargemünd 2, all of Fed. Rep. of Germany

[21] Appl. No.: 276,791

[22] Filed: Jun. 24, 1981

Related U.S. Application Data

[63] Continuation-in-part of Ser. No. 137,507, Apr. 4, 1980, Pat. No. 4,340,634.

[30] Foreign Application Priority Data

Apr. 10, 1979 [DE] Fed. Rep. of Germany ....... 2914436
Jul. 17, 1979 [DE] Fed. Rep. of Germany ....... 2928848

[51] Int. Cl.³ .......................... B32B 3/10; B32B 3/28
[52] U.S. Cl. ...................................... 427/44; 427/258; 427/264; 427/272; 427/278; 427/360; 427/368; 428/138; 428/155

[58] Field of Search ................. 427/44, 258, 264, 272, 427/278, 360, 368; 156/634; 428/155, 137, 138, 142

[56] References Cited

U.S. PATENT DOCUMENTS 4,242,378  12/1980  Arai ..................................... 427/264

FOREIGN PATENT DOCUMENTS 800857  12/1950  Fed. Rep. of Germany .

Primary Examiner—Paul J. Thibodeau
Attorney, Agent, or Firm—Michael N. Meller

[57] ABSTRACT

Heat reflecting wall covering comprising a carrier substrate having a discontinuous metal layer thereon produced by (1) providing a brittle coating under the metal layer and then breaking up the same to also break-up the metal layer; or (2) selectively etching the metal layer to avoid any large electrically conductive areas; or (3) spraying the metal layer through a mask, such as wire mesh to obtain high ohmic resistance and subsequently covering with a veneer protection coat and a veneer coat.

9 Claims, 3 Drawing Figures

HEAT REFLECTING WALL PAPER OR WALL COVERING

RELATION TO OTHER APPLICATIONS

This application is a continuation-in-part of application Ser. No. 137,507, filed Apr. 4, 1980 and issued as U.S. Pat. No. 4,340,634 on July 20, 1982.

BACKGROUND OF THE INVENTION

1. Field of the Invention

This invention relates to a heat-reflecting wallpaper or wall covering and the method for producing the same comprising a substrate, an optional coat of a brittle material a thin metal coat, thereon a veneer-protecting coat, and finally a veneer coat applied on one or both sides of an elastic substrate, particularly a plastic sheet or plastic-coated material.

2. Description of the Prior Art

German Utility Model No. 7,343,047 already discloses a known wall liner material comprising a hard foamed layer with an aluminum layer attached thereto. The outer surface of the aluminum layer may be embellished by an embossed pattern and provided with a protective veneer coating to obtain dirt-repellent properties.

German Pat. No. 677,123 teaches a metallized wallpaper, in which the metallic surface layer as well as the underlying intermediate paper layer are provided with aligned perforations in order to achieve improved moisture permeability, the two interconnected and perforated layers being attached to a further non-perforated paper-base layer.

German Pat. No. 800,857 also shows a metallized wallpaper of the above defined type, this wallpaper being provided with a very thin veneer coating which may or may not be colored in any manner.

These prior art wallpapers have in common the disadvantage that they are not able to effect optimum heat reflection, when having colored coatings. On the other hand, the metal layer must be provided with a colored coating, otherwise the glossy metallic surfaces are not accepted for the decoration of normal dwelling spaces, for aesthetic reasons.

OBJECTS AND SUMMARY OF THE INVENTION

It is therefore an object of the present invention to provide a heat reflecting wallpaper or wall covering which has a particularly pleasant appearance, due to its design in the form of an infrared-permeable veneer coat and a veneer-protective coat, and which shows at the same time great heat insulation and/or reflection characteristics. Such a wallpaper has also comfort-increasing and cost-saving effects. Another advantage of the wallpaper is that the metal layer therein is discontinuous so that the wallpaper has practically no transverse electrical conductivity, and there is no risk in the use of these wallpapers, for example, when accidentally contacting electrical wiring, switches, electrical appliances or the like.

It is a further object of the present invention to provide a method for the production of heat-reflecting wallpaper or wall coverings of the above-mentioned type which make it possible, even when using elastic or plastic substrates, that the metal coat loses practically all of its electrical conductivity.

It is generally known that, due to the high density of free electrons, metal layers are able to reflect electromagnetic radiations at layer thicknesses considerably smaller than the wavelength of the radiation. The magnitude of reflection is correlated to the surface resistance of the metal layer and no longer increases appreciably above a surface resistance of 2 Ohms per square for $1\ \mu m < \lambda < 20\ \mu m$. This corresponds to a thickness of 14 nanometers of an aluminum layer, i.e. the metal most frequently used for vapor deposition. In order to also include other metals and to make allowance for irregularities in the vapor-deposited layer, the thickness thereof has been established at 30 nanometers. Layers of greater thickness are also possible, a greater thickness does not, however, result in a further improved reflectivity. On the other hand, a greater thickness of the layer requires a greater amount of material to be vapor-deposited, resulting in an unnecessary increase in the production cost. In the case of a greater thickness of this layer, it is moreover no longer ensured that the metal layer can be effectively broken up into numerous small islands by treating the wallpaper. It is only if this break-up of the metal layer is achieved to a sufficient degree, however, that the metallic layer loses its undesirable conductivity.

This problem is solved according to one embodiment of this invention by using as a coat between the substrate and the metal coat, a material that hardens or is hardenable to a breakable or brittle coat. The hardened brittle coat is broken or deformed mechanically so as to form cracks in the overlying coat of metal. An essential idea of this method is that the metal coat bears on a hard, brittle coat, that is, the brittle coat should be hard relative to the elastic or plastic substrate and be breakable by mechanical deformation. For producing such a brittle coat, there can be employed materials which either harden themselves or can be hardened by external action, for example, by means of light, particularly UV- or IR radiation or by means of electron beams. The brittle coat need not be hardened over its entire surface. It suffices, if this coat is only hardenable in a pattern, so that it breaks only in certain areas by mechanical deformation. This embodiment which is considered the best mode employs as suitable materials for such brittle coats those that are self-hardening or hardenable varnishes, such as polyesters, polyurethanes, epoxides, phenols or acrylates, which are readily known to the man skilled in the art. A mechanical deformation of the entire coat structure, consisting of the substrate, brittle coat, metal coat, another adhesive varnish protecting coat and the varnish coat can be effected, for example, by milling.

The thickness of the veneer protecting coat which also serves as a primer for the covering veneer coat is selected so that it becomes substantially free of pores by repetitive application so as to prevent corrosion of the metal layer. At the same time it remains highly transparent over the entire spectral range of thermal radiation. Depending on the type of veneer and the method of application, this thickness lies within the range of a few $\mu m$. A main reason for employing wallpapers and liners is the decoration of walls and/or ceilings. Appearance of the wall paper must not be affected to any appreciable degree by other functions, even if these, as in the present case, result in considerable improvements and/or energy savings.

It is therefore essential that the original metallic-looking wallpaper be provided with selected colors. Conventional wall paints are based, however, on binders having very pronounced infrared absorption properties. These paints are applied in uncontrollable thickness ranges and contain pigments the selection and particle size of which, is solely governed by visual criteria. In the wavelength range of thermal radiation those paints therefore have an absorbent effect, i.e. they give "black" or "cold" impressions.

While this invention is described in terms of wall linings, coverings or wallpaper, it is equally applicable for use on tiles made of ceramics, asbestos, polystyrene-type foam or the like, in other words, the type of material tiles are generally made of and known in the wall and ceiling decorating art. Such tiles, for instance, can be employed for the lining of the walls and ceilings of swimming pools, resulting in a 30% or more savings from an energy standpoint by eliminating the need for keeping the air in an indoor swimming pool 3-4 degrees centigrade higher than the water, while keeping the humidity at comfortably low levels.

In order to retain the high thermal reflectivity and hence the cozy and energy-saving effects of a metallized wall covering, the color applied with the veneer coat has to be substantially transparent in the wavelength range of 4 to 20 $\mu$m. This is obtained by employing binders having no appreciable absorption properties within this range and containing dissolved coloring agents which are likewise transparent in this spectral range and/or pigments the coloring of which is independent of their particle size. Known binders which are transparent in the infrared range are for instance polymethylene or diazo methane, low density polyethylene, high density polyethylene, isomerized rubber (cyclorubber), various polyamides, low-molecular acrylates etc. The total infrared absorption of layers of these materials having a thickness of 10 $\mu$m is less than 10%.

The thickness of the veneer protection coat should be selected to be as small as possible, preferably not greater than $\lambda/4$ as referred to the shortest relevant wavelength. A coating thickness of for instance 0.5 $\mu$m has been found to be particularly suitable. This coat may consist of the same binder materials as employed for the veneer coat, such as polymethyl acrylate.

For coloring the binder layer, forming the veneer coat, use is preferably made of coloring agents which are transparent in the infrared range, such as alizarine or azo dyes. If pigment particles are employed in the binder coat in order to adapt this coat for use as a priming coat, such pigment particles should all have a diameter of less than 1 $\mu$m. Thus, for instance, the size distribution of the pigment particles which has been found suitable, is one in which the particle diameters are in a Gauss distribution of about 0.35 $\mu$m. The ratio of binder to pigment particles should be selected as wide as possible, and the coating thickness of the veneer as narrow as possible. Preferably the coating thickness and the binder/pigment ratio are selected such that an average of about two pigment particle strata are loosely imbedded in the binder, resulting in a high transparency of the veneer coat over the entire relevant infrared range. An acceptable thickness of this layer lies for instance within the order of between 1.5 to 2.0 $\mu$m. Suitable pigments are substances lacking infrared molecular resonance. Such resonances are characteristic for instance in organic substances including radicals. Preferably suitable are inorganic pigment compositions such as $TiO_2$.

The combined effect of colored pigments with a coloring by means of soluble dyes in the binder coating in accordance with the above-described principle may result in various color effects within the optical range, offering a wide freedom of choice for color designs.

The invention also recognizes that a heat reflecting wallpaper or a corresponding wall covering will only be economically useful if it is in fact accepted by the consumer. This can only be achieved if the wallpaper can be processed in accordance with conventional techniques, i.e. without additional expenditure and without expensive methods, for instance without the requirement of special adhesives, and if the wallpaper or wall covering can be printed with the customary patterns, it can then conform to the requirements of the market.

These requirements can be satisfied by a heat-reflecting wallpaper, comprising a carrier substrate consisting of a thin special paper covered with a thin primer veneer coat, a metal coat; a veneer protection coat; and a veneer coat thereon. The carrier substrate can then be attached to a wallpaper base by means of an adhesive lining.

Wallpapers of this type may readily be processed in accordance with convention wallpapering methods. Moreover, the outer face of the wallpaper may be printed with customary designs or patterns by conventional printing methods. Both of these properties make the wallpaper acceptable to the consumer, so that it is willingly employed, whereby the desired economic benefit, namely, a saving of heat energy is also accomplished. Since the wallpaper can be printed with the customary designs or patterns, it provides the same aesthetic qualities as hitherto known wallpapers, with the additional advantage that a considerable amount of energy is saved for room heating.

Turning now to one embodiment of the hardened brittle coat, this brittle material will break down into distinct pieces during a mechanical deformation at many points with the metal coat thereon likewise broken. The metal coat is thus split into a plurality of practically separate partial surfaces, so that the ohmic resistance of the wallpaper is so increased and the electrical conductivity respectively of the coat is so reduced, that the danger, because of potential contact with electrical wiring is thus minimized, if not outright eliminated.

A particularly suitable method for stabilizing the cracks in the metal coat, particularly employing substrates of thermoplastic material is carried out as follows: The coat structure consisting of the layers of (1) the substrate; (2) the adhesive coat layer hardening at least into a pattern applied thereupon; (3) the metal coat; (4) the veneer-protecting coat applied thereon, if necessary; and (5) the veneer coat are conducted over a heated embossing roll for the mechanical deformation of the hardened brittle coat. The embossing roll is kept at a temperature which is so high that the thermoplastic material of the substrate is permanently deformed, but the temperature is, on the other hand, selected relatively low enough so that this adhesive coat remains in a hard and breakable i.e. non-plastic state at this temperature. The coat layer arrangement is preferably so conducted over the embossing roll that the substrate is in contact with the embossing roll. Due to the heated roll, the substrate is heated to such an extent that, when the coat arrangement is conducted over it, the thermoplastic material begins to flow in the substrate during the embossing. The subsequent cooling of the thermoplastic material maintains its changed shape resulting in a permanent deformation that determines the shape and form of the cracks in the metal coat. With this method, it is possible to treat substrates consisting entirely of thermoplastic materials, e.g. pure plastic sheets, and substrates of another base material, like textiles or non-woven fabrics or paper, that are provided with a plastic coat or impregnated with a plastic.

According to another embodiment of this invention, the problem of conductivity of the metal layer can be eliminated in that the veneer-protecting coat on the metal coat is designed as a masking coat forming a predetermined pattern. Thus the metal coat is subdivided by an etching process into a plurality of insular partial surfaces corresponding to this pattern. Following this step, the veneer coat is applied. Employing this method, it may be advisable to provide an adhesive coat between the substrate and the metal coat, however, such an adhesive coat is not absolutely necessary, depending on the type of the substrate selected and the vaporized partial coat. As a varnish protecting coat, one may also employ a photoresist which is exposed with a desired picture according to the pattern. Depending on the selection of the photoresist, the exposed and unexposed areas are hardened and can be dissolved in a subsequent washing process. The metal coat exposed in this manner according to the pattern, can then be etched by known etching processes, so that only the partial coat under the photoresist areas which have not been washed out remain. The veneer coat can then be applied directly onto the coat arrangement consisting of the substrate, insular metal coat surfaces and photoresist surfaces.

Another particularly simple method according to the invention for the solution of the above problem consists in treating the thin metal coat or the surface of the adhesive veneer-protecting coat already applied on the metal coat mechanically in such a way, that before other coats are applied, the metal coat is severed along a plurality of lines. Since the metal coat itself is extremely thin, preferably less than 30 nm, and the adhesive veneer-protecting coat applied thereon, is likewise extremely thin, as it has only a thickness of a few micrometers, mechanical treatment, such as by means of brushes or combs, suffices to form the desired lines separating the metal coating. To this end, the substrate is preferably passed over revolving brushes or combs. This way a grid pattern is scratched into the surface in a simple manner, so that a plurality of unconnected partial surfaces is formed from the metal coat. There is applied on this metal coat the veneer-protective coat to prevent corrosion of the metal coat, and finally the IR-permeable veneer coat.

Another embodiment according to this invention involves placing a mask on the substrate, vapor-depositing the metal on the mask in a structure corresponding to the mask, and after removing the mask applying the veneer protecting coat and the veneer coat. This is preferably done in a manner so that the substrate is brought into contact with a mask having the recesses which must correspond to the pattern which the applied metal coat is to have in the finished state. The metal coat is preferably applied by vapor-deposit through the mask, although deposit from a plating bath is also within the scope of this invention. After the vaporization, the mask is removed from the substrate, then the veneer-protecting coat, as well as the final veneer coat is applied. The mask could consist, for instance, of an endless wire net belt which is brought into contact with the substrate in front of a vapor-deposit zone for the application of the metal coat while resting on the substrate. The vapor is then deposited through the wire net. After leaving the vapor deposit zone, the wire net can then be detached from the substrate and returned to the inlet side of the vaporization zone.

Vapor depositing of the metal coat, compared to application of the metal coat from the solution, has the advantage that a metal coat with a higher degree of reflection is generally obtained, and that the metal coating can be produced more economically.

In order to facilitate processing of the wallpaper in accordance with conventional techniques, the wallpaper base is selected in the weight range of 100 to 200 g/m$^2$, the metal-coated thin special paper is selected in the weight range of 10 to 50 g/m$^2$, and the adhesive lining is applied therebetween in a thickness of about 10 $\mu$m. This combination of layers has already been successfully put to practical tests. During development of the wallpaper, according to the invention, it was found that the adhesive lining, which originally had been solely intended for bonding the wallpaper base to the carrier substrate, is preferably selected such that it additionally performs the following functions:

1. The adhesive lining, which consists for instance of polyvinyl chloride and is used in the finished wallpaper to bond the wallpaper base to the special paper, so that it extends in the mechanically neutral zone, is preferably of a sort of flexible material so as to improve the pliancy and flexibility of the finished wallpaper. This enables the hobby craftsman to attach the wallpaper to a wall without difficulty.

2. By selecting a suitable chemical composition for the adhesive lining, the combustibility and inflammability of the wallpaper can be reduced.

3. The chemical composition of the adhesive lining is preferably selected so that it protects the metal layer from corrosion by alkaline substances exuded by an underlying wall.

Depending on their surface temperature and emission characteristics, outside walls absorb the body heat of the inhabitants. If this heat is reflected by the wallpaper, it induces a radiation climate within the room, so that the required comfort is ensured even at lower room temperatures.

This effect is of considerable economic importance, as it permits the air and room temperature of heated spaces to be lowered by at least 2° to 5° C., without undesirable physiological effects.

In generally accessible publications, it has been stated that a lowering of room temperatures by 3° C. results in a 18 p.c. saving of heating material, which is of considerable importance in the present situation.

A particularly pleasant room climate is ensured by the fact that the metal layer is extremely thin, so that it is torn during rolling of the wallpaper, whereby the wallpaper as a whole becomes permeable to water vapor.

BRIEF DESCRIPTION OF THE DRAWINGS

The invention will now be described more fully on the basis of the embodiments represented in the drawings by way of example.

FIG. 1 shows the structure of finished wallpaper, where the substrate consists of a plastic sheet 10, such as a polyester sheet. There was applied onto this plastic sheet a cross-linked acrylate as the self-hardening brittle coat 11. Coat 11 itself has only a thickness of a few μm. Aluminum coat 12 having a thickness of about 25 μm was then vaporized onto brittle coat 11. A veneer-protecting coat 13 made of a linear polyester was then applied and finally a veneer coat 14. The coat layers 16 thus formed were then subjected to milling where the hardened coat 11 was broken at a plurality of points 15. By breaking the coat 11, the aluminum coat 12 was broken at the same points 15. Cracks 15 are shown greatly exaggerated for purposes of illustration.

Figure 1:
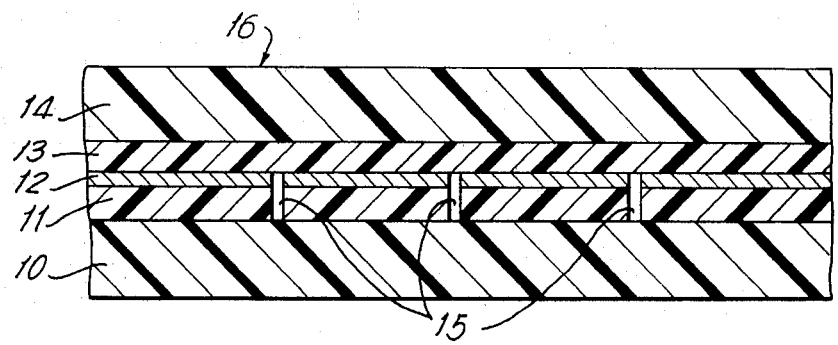
FIG. 1 shows a cross-sectional view of wallpaper produced according to a first embodiment of the invention.
Figure 2:
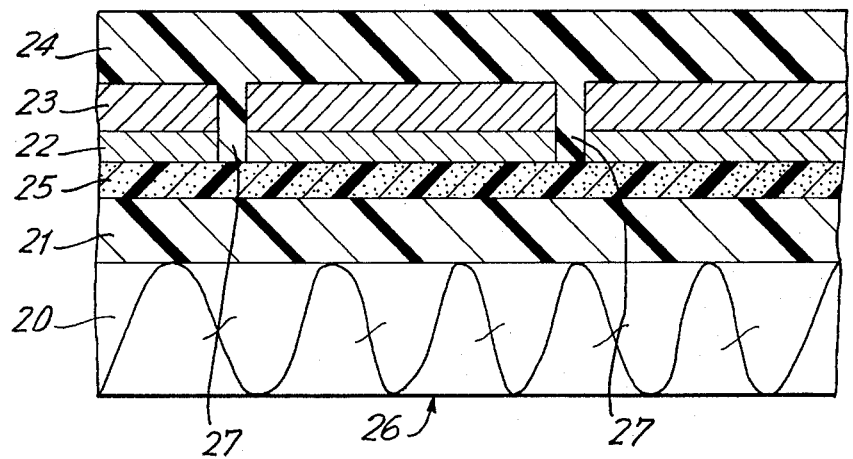
FIG. 2 shows a cross-sectional view of wallpaper produced according to a second embodiment of the invention.

In the wallpaper shown in FIG. 2, the substrate consists of a fabric 20 on which a vinyl coat 21 is applied. On vinyl coat 21, there was applied an adhesive coat 25 made of an acrylate. Then a metal coat of copper 22 was deposited by vaporization. The metal coat could also have been vapor-deposited directly on vinyl coat 21, without acrylate coat 25.

On metal coat 22, there was then applied a photoresist coat, which was exposed by radiation with UV light according to a pattern, such as at points 27. The exposed areas were then washed out in a subsequent process step and metal coat 22 was subsequently etched away in an etching process at points 27 exposed by photoresist 23. This way the thickness of the furrows traversing the entire coat 22 was formed, as shown at 27. Subsequently a veneer coat 24 was applied and a total coat layer arrangement 26 was obtained where metal coat 22 consists merely of substantially unconnected islets.

Figure 3:
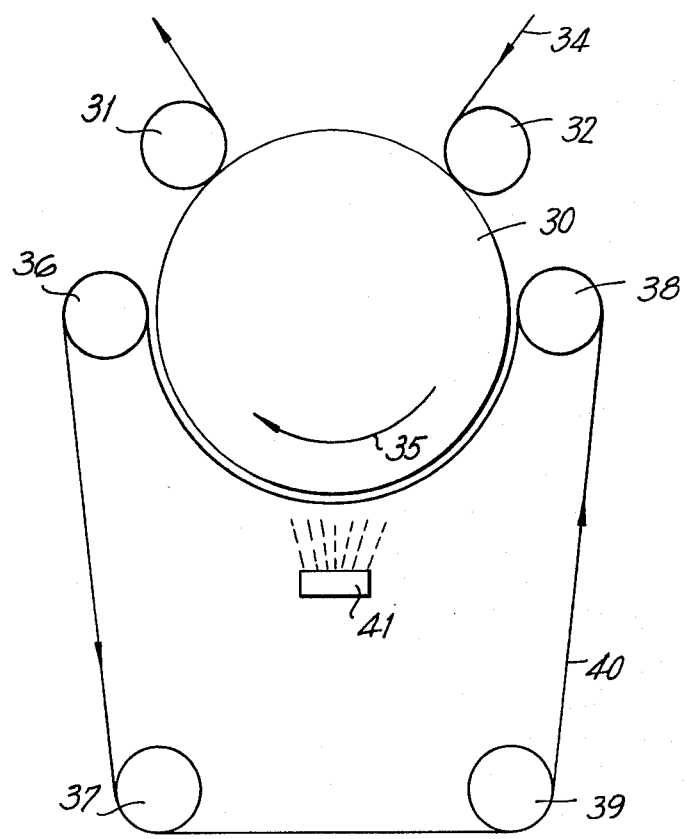
FIG. 3 shows a schematic representation of an alternative method according to the invention for the production of the desired heat-reflecting wallpaper.

FIG. 3 shows an embodiment of a step in the method for the production of a heat-reflecting wallpaper, with which the metal coat can already be formed in the form of unconnected partial surfaces during the vaporization. 30 denotes schematically a drum or roll around which runs a substrate in the form of belt 34 with an adhesive coat already applied which can be coated with a metal coat. Belt 34 is so guided by rolls 31 and 32 that it bears on roll 30 over ¾ of its circumference. The roll itself is turned in the direction of arrows 35. A metal vaporization source 41 is provided to deposit the vaporized metal on belt 34. Furthermore, there is also provided an endless belt 40 of a wire net or mesh forming a mask. This wire mask or net belt 40 runs over rolls 36, 37, 39, 38 in the direction of the indicated arrows at a speed corresponding to the circumferential speed of the drum 30. Belt 40 bears on the substrate on the side of belt 34 facing vaporization source 41, after it has run around roll 38. Wire mesh or net belt 40 is then separated from the surface of belt 34, after it has passed through the vaporization zone via roll 36 and returns by means of rolls 37 and 39 to roll 38 at the inlet of the vaporization zone. During its passage through the vaporization zone, the wire mesh thus bears on the substrate and has the effect that metal is only vapor deposited on the surface of the substrate exposed by the wire mesh. After the metal coat has been formed in the form of unconnected islets, the other coats, like the veneer-protecting coat and the veneer coat are finally applied.

It is evident that those skilled in the art, once given the benefit of the foregoing disclosure, may now make modifications of the specific embodiments described herein without departing from the spirit and scope of the present invention. Such modifications are to be considered within the framework of this invention which is limited solely by the scope and spirit of the appended claims.

We claim:

1. A method for the production of a heat-reflecting covering comprising coating a substrate with a metal coat in a thickness of less than 30 nanometers, a veneer protecting coat having a thickness of about 0.5–2.0 μm and a veneer coat having a thickness of about 1.5 to 2.0 μm, both of said veneer protecting coat and said veneer coat being substantially transparent in the wavelength range of 4 to 20 μm, wherein the metal-coated substrate is treated so as to cause it to create distinct breaks in the metal layer surface so that the metal layer thereon will be effectively of such high ohmic resistance as to be electrically non-conductive.

2. The method of claim 1, wherein a coat of a brittle material is applied on the substrate before the metal coat is applied.

3. The method of claim 2, wherein the brittle coat is deformed by milling.

4. The method of claim 1, wherein the brittle coat is hardened in a predetermined pattern before the metal coat is applied.

5. The method of claim 2, wherein the brittle coat is hardened with UV radiation, IR-radiation or electron beams.

6. The method of claim 2, wherein the substrate comprises a thermoplastic material and mechanical deformation of the brittle coat is conducted by passing the coated substrate over a heated embossing roll in such a way that the substrate is in contact with the embossing roll, and that the embossing roll is kept at a temperature at which the thermoplastic material of the substrate is permanently deformable, while the brittle coat is still in a hard brittle state.

7. The method of claim 1, wherein the thin metal coat is subdivided by mechanical treatment with brushes or combs into a plurality of partial surfaces before subsequent coats are applied.

8. The method of claim 1, wherein a mask is applied on the substrate, with the metal coat vapor-deposited through the mask on the substrate in a pattern corresponding to the mask, and, after the mask is removed, said veneer-protecting coat and veneer coat are applied.

9. The method of claim 8, wherein the mask has the form of an endless wire net belt which is brought continuously in contact with the substrate in front of the vapor depositing zone, conducted together with the substrate at the same speed through the vapor depositing zone, and detached again from the substrate after leaving the vapor depositing zone.

* * * * *